US008259173B2

United States Patent
Iwano (10) Patent No.: US 8,259,173 B2
(45) Date of Patent: Sep. 4, 2012

(54) IMAGE GENERATING APPARATUS AND IMAGE GENERATING METHOD

(75) Inventor: Hirotaka Iwano, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 1123 days.

(21) Appl. No.: 11/902,952

(22) Filed: Sep. 26, 2007

(65) Prior Publication Data

US 2008/0136912 A1 Jun. 12, 2008

(30) Foreign Application Priority Data

Sep. 26, 2006 (JP) .................................. 2006-260424

(51) Int. Cl.
*H04N 7/18* (2006.01)
(52) U.S. Cl. ...................................... 348/148; 348/143
(58) Field of Classification Search .................. 348/148, 348/143
See application file for complete search history.

(56) References Cited

U.S. PATENT DOCUMENTS

| 7,161,616 B1 * | 1/2007 | Okamoto et al. ............. 348/148 |
| 2005/0249379 A1 | 11/2005 | Yoshimura | |

FOREIGN PATENT DOCUMENTS

| JP | 3286306 | | 3/2002 |
| JP | 2002-127852 | | 5/2002 |
| JP | 2002127852 A | * | 5/2002 |
| JP | 2005-311666 | | 11/2005 |
| JP | 2005-311868 | | 11/2005 |
| JP | 2005311666 A | * | 11/2005 |
| JP | 2005-236493 | | 9/2006 |
| WO | WO 00/64175 | | 10/2000 |

* cited by examiner

*Primary Examiner* — Ario Etienne
*Assistant Examiner* — Hee Soo Kim
(74) *Attorney, Agent, or Firm* — Dickstein Shapiro LLP

(57) ABSTRACT

An image generating apparatus, which generates monitor image data from camera image data through a viewpoint transformation, includes a rear camera, an image processing controller, and a monitor. The image processing controller sets a virtual stereoscopic imaging plane as a virtual imaging plane of a virtual camera set at a position higher than the rear camera, transfers each picture element by a coordinate transformation between a position of each picture element of single camera image data captured by the rear camera and a position of each picture element on the virtual stereoscopic imaging plane of the virtual camera through a virtual projection plane set on ground, and generates corresponding monitor image data.

14 Claims, 6 Drawing Sheets

IMAGE OF
REAL CAMERA
IMAGING PLANE

FIG.3B

IMAGE OF
VIRTUAL PLANE
IMAGING PLANE

FIG.4A

IMAGE OF
REAL CAMERA
IMAGING PLANE

FIG.4B

IMAGE OF
VIRTUAL PLANE
IMAGING PLANE

SCHEMATIC VIEW OF
WIDE ANGLE CAMERA

FIG.10B

SCHEMATIC VIEW OF
PINHOLE CAMERA

DIMENSIONLESS QUANTITY
P(x,y)

$P(u,v) = ue_u + ve_v$

QUANTITY IN REAL SPACE
(WORLD COORDINATE SYSTEM)

IMAGE GENERATING APPARATUS AND IMAGE GENERATING METHOD

CROSS REFERENCE TO RELATED APPLICATION

The present application is based on and claims priority from Japanese Application Number 2006-260424, filed with the Japanese Patent Office on Sep. 26, 2006, the disclosure of which is hereby incorporated by reference herein in its entirety.

BACKGROUND

The present invention relates to an image generating apparatus which generates monitor image data from camera image data through a viewpoint transformation using a virtual camera and a virtual projection plane, and to an image generating method.

As driving assistance devices, one disclosed in Japanese Patent Application Laid-Open Publication No. 2005-236493 has been heretofore known. The disclosed driving assistance device aims to provide a driver with an easy-to-understand image while changing a screen configuration and a viewpoint position in response to a move of a vehicle. To this end, the disclosed driving assistance device switches a single viewpoint image and a multi-viewpoint image in response to every move of the vehicle. The single viewpoint image is displayed as a downward view in which multiple camera images shot by multiple imaging devices are viewed from a single viewpoint, and the multi-viewpoint image is an image in which multiple camera images are respectively displayed on divided screens.

In addition, as conventional image generating apparatuses, one disclosed in Japanese Patent No. 3286306 has been known. This disclosed image generating apparatus synthesized multiple images shot by several cameras into a single image, and displays the single image instead of displaying the multiple images independently, so that a situation of the entire area shot by the several cameras can be intuitively grasped.

However, the driving assistance device described in Japanese Patent Application Laid-Open Publication No. 2005-236493 described above has a problem that a user is required to perform a selecting operation between the single viewpoint image and the multi-viewpoint image in order to grasp a situation around the vehicle. This operation is necessary because, the single viewpoint image shows only a close view by displaying a downward image, while the multi-viewpoint image shows only distant views by displaying camera images. In addition, since both of the single viewpoint image and the multi-viewpoint image are displayed by using multiple camera images, both types of images have problems that no continuity exists in a synthesis image and divided images, and that double shooting of the same image or image missing occurs.

The image generating apparatus described in Japanese Patent No. 3286306 is intended for displaying, as a single synthesis image, a situation of the entire area shot by the several cameras. Accordingly, in order to provide continuity to the synthesis image, the image generating apparatus needs to be provided with: a discriminative point extraction means for extracting discriminative points from multiple camera images, and a calibration means for calibrating a display image by using the multiple discriminative points. Consequently, the calculation processes for generating monitor image data become complicated. On the other hand, an absence of the discriminative point extraction means and the calibration means causes the problems of no continuity in a synthesis image, double shooting of the same image, and image missing.

SUMMARY

An object of the present invention is to provide an image generating apparatus and an image generating method, capable of generating monitor image data in which a downward display image of a close view and a perspective display image of an intermediate-to-distant view are seamlessly connected to each other, while simplifying calculation processes.

In order to accomplish the above object, an image generating apparatus of the invention comprises: a real camera which captures camera image data projected onto a single real imaging plane and ranging from a close view to a distant view; an image processing controller which sets a virtual camera at a position higher than the real camera, which sets a virtual projection plane from the virtual camera on ground, which sets a virtual stereoscopic imaging plane, as a virtual imaging plane of the virtual camera, including a close view imaging plane parallel to the ground and a distant view imaging plane connected to a side of the close view imaging plane near from the real camera and set to have a predetermined downward tilt angle, which performs a coordinate transformation between a position of each picture element of the single camera image data captured by the real camera and a position of each picture element on the virtual stereoscopic imaging plane of the virtual camera through the virtual projection plane, which transfers the each picture element of the camera image data onto the virtual stereoscopic imaging plane of the virtual camera according to the coordinate transformation, and which generates monitor image data for obtaining a monitor image, the monitor image being as an image to be projected on the virtual stereoscopic imaging plane when the virtual projection plane is viewed from the virtual camera; and a monitor which displays a synthesis image in which a downward image of the close view and a perspective image of an intermediate view to the distant view projected by the monitor image data generated by the image processing controller are synthesized.

The image processing controller may set the distant view imaging plane of the virtual stereoscopic imaging plane of the virtual camera to be in parallel with the real imaging plane of the real camera.

A mapping table may be generated by performing a coordinate transformation of a position of each picture element in an order of: designating one position of the picture element on the virtual stereoscopic imaging plane of the virtual camera; determining a first corresponding position on the virtual projection plane, corresponding to the designated one position of the picture element; and determining a second corresponding position on the imaging plane of the real camera, corresponding to the first corresponding position, and the image processing controller may perform a coordinate transformation, by using the mapping table, between the position of the each picture element of the single camera image data captured by the real camera and the position of the each picture element on the virtual stereoscopic imaging plane of the virtual camera.

A transformation relationship characteristic indicating a relationship between a distance of a picture element from an optical axis by a distorted image of the camera image data and a distance of a picture element from an optical axis by a non-distorted image of the camera image data may be determined in advance, and the image processing controller may correct a distortion of a coordinate system of the position of the each picture element of the single camera image data captured by the real camera, by using the distance of the each picture element from the optical axis and the transformation relationship characteristic, to transform it into a coordinate system of the virtual stereoscopic imaging plane.

The image processing controller may be connected with a virtual camera setting operation member which sets the virtual camera on an arbitrary spatial position in accordance with an external operation.

The image processing controller may be connected with a virtual stereoscopic imaging plane setting operation member which arbitrarily sets the downward tilt angle of the distant view imaging plane to the close view imaging plane in accordance with an external operation.

The real camera may be a rear camera attached to a rear part of a vehicle and which images a view behind the vehicle.

In addition, an image generating method of the present invention comprises: capturing camera image data projected onto a single real imaging plane of a real camera and ranging from a close view to a distant view; setting a virtual camera at a position higher than the real camera; setting a virtual projection plane of the virtual camera on ground; setting a virtual stereoscopic imaging plane, as a virtual imaging plane of the virtual camera, including a close view imaging plane parallel to the ground and a distant view imaging plane connected to a side of the close view imaging plane near from the real camera and set to have a predetermined downward tilt angle; performing a coordinate transformation between a position of each picture element of the single camera image data captured by the real camera and a position of each picture element on the virtual stereoscopic imaging plane of the virtual camera through the virtual projection plane; generating monitor image data for obtaining a monitor image, the monitor image being as an image to be projected on the virtual stereoscopic imaging plane when the virtual projection plane is viewed from the virtual camera, by transferring the each picture element of the camera image data onto the virtual stereoscopic imaging plane of the virtual camera according to the coordinate transformation; and displaying on a monitor a synthesis image in which a downward image of the close view and a perspective image of an intermediate view to the distant view projected by the generated monitor image data are synthesized.

The distant view imaging plane of the virtual stereoscopic imaging plane of the virtual camera may be set to be in parallel with the real imaging plane of the real camera.

A mapping table may be generated by performing a coordinate transformation of a position of each picture element in an order of: designating one position of the picture element on the virtual stereoscopic imaging plane of the virtual camera; determining a first corresponding position on the virtual projection plane, corresponding to the designated one position of the picture element; and determining a second corresponding position on the imaging plane of the real camera, corresponding to the first corresponding position, and a coordinate transformation, by using the mapping table, between the position of the each picture element of the single camera image data captured by the real camera and the position of the each picture element on the virtual stereoscopic imaging plane of the virtual camera may be performed.

A transformation relationship characteristic indicating a relationship between a distance of a picture element from an optical axis by a distorted image of the camera image data and a distance of a picture element from an optical axis by a non-distorted image of the camera image data may be determined in advance, and a distortion of a coordinate system of the position of the each picture element of the single camera image data captured by the real camera may be corrected, by using the distance of the each picture element from the optical axis and the transformation relationship characteristic, to transform it into a coordinate system of the virtual stereoscopic imaging plane.

The virtual camera may be set on an arbitrary spatial position in accordance with an external operation to a virtual camera setting operation member.

The downward tilt angle of the distant view imaging plane to the close view imaging plane may be set in accordance with an external operation to a virtual stereoscopic imaging plane setting operation member.

The camera image data may be captured by a rear camera attached to a rear part of a vehicle and which images a view behind the vehicle.

BRIEF DESCRIPTION OF THE DRAWINGS

The above and other objects, features and advantages of the present invention will become more apparent from the following description when taken in connection with the accompanying drawings.

DETAILED DESCRIPTION

Hereinafter, a best mode for attaining an image generating apparatus and an image generating method of the present invention will be described, on the basis of an embodiment 1 illustrated in the drawings.

Figure 1:
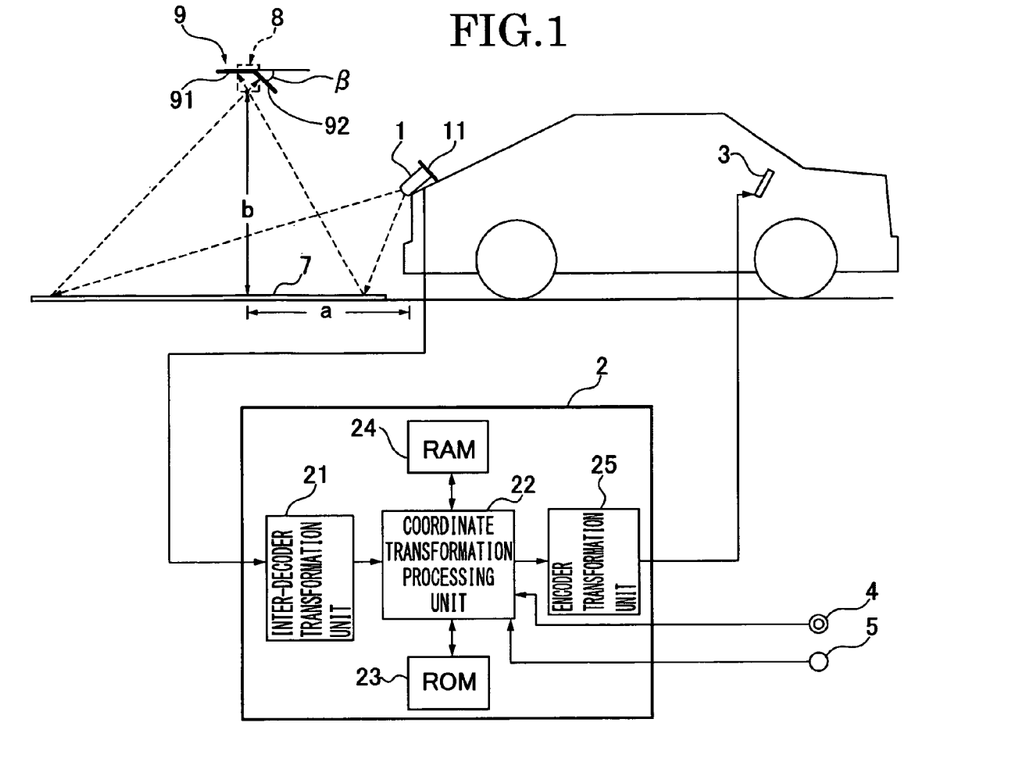
FIG. 1 is a view of an entire system illustrating an image generating apparatus applied to a rear camera of a vehicle of Embodiment 1.
Figure 2:
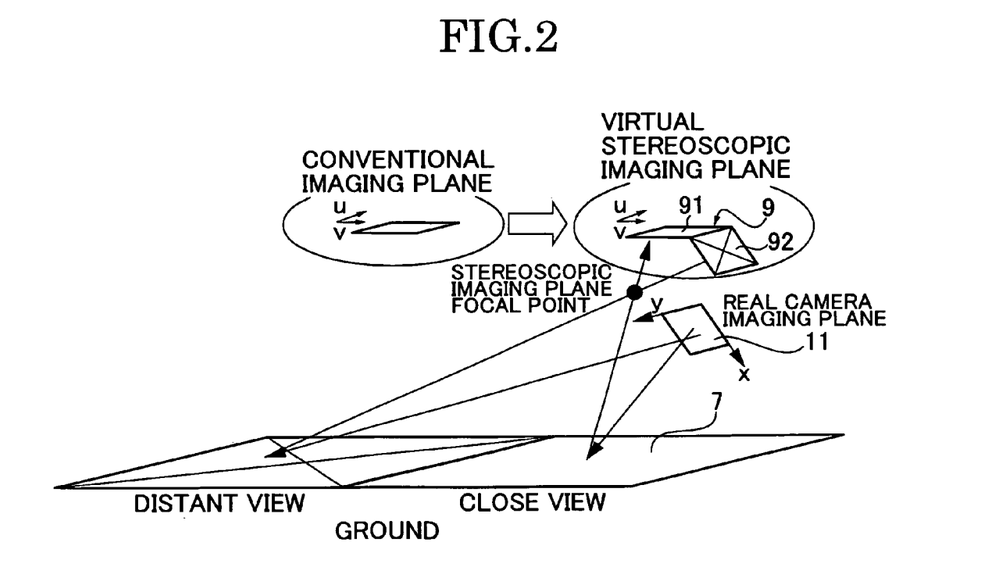
FIG. 2 is a schematic view for describing an example of a viewpoint transformation technique using a virtual projection plane and a virtual stereoscopic imaging plane in the image generating apparatus of the Embodiment 1.

First, a configuration will be described. FIG. 1 is a view illustrating an entire system of an image generating apparatus of the Embodiment 1, employed in a rear camera of a vehicle. FIG. 2 is a schematic view for describing an example of a viewpoint transformation technique using a virtual projection plane and a virtual stereoscopic imaging plane in the image generating apparatus of the Embodiment 1.

The image generating apparatus of the Embodiment 1 is a device which generates monitor image data from camera image data by a viewpoint transformation using a virtual camera and a virtual projection plane. As illustrated in FIG. 1, the image generating apparatus of the Embodiment 1 includes a rear camera 1 (a real camera), an image processing controller 2, a monitor 3, a virtual camera position adjustment operation knob 4 (a virtual camera setting operation member), and an imaging plane angle adjustment operation knob 5 (a virtual stereoscopic imaging plane setting operation member).

As illustrated in FIG. 1, the rear camera 1 is attached to a rear position of the vehicle, and shows an image of a view behind the vehicle. This rear camera 1 captures camera image data using an image projected on a real imaging plane (a rear camera CCD).

As illustrated in FIGS. 1 and 2, on the side of an optic axis of this rear camera 1, a virtual stereoscopic projection plane 7 is set on the ground.

In addition, as illustrated in FIGS. 1 and 2, a virtual camera 8 is set on a position higher than the rear camera 1. The position of the virtual camera is defined by a distance a from the rear camera 1 in the horizontal direction, and a distance b from the ground in the vertical direction.

Moreover, a virtual stereoscopic imaging plane 9 is set as a virtual imaging plane of the virtual camera 8, as illustrated in FIGS. 1 and 2, which includes a close view imaging plane 91 parallel to the ground, and a distant view imaging plane 92 connected to a portion of the close view imaging plane 91 near the rear camera 1 and set at a predetermined downward tilt angle $\beta$.

The image processing controller 2 has an inter-decoder transformation unit 21, a coordinate transformation processing unit 22, a ROM 23, a RAM 24, and an encoder transformation unit 25.

The inter-decoder transformation unit 21 transforms a data coordinate system between two decoders of a decoder connected to the rear camera 1 and a decoder which is assumed to be used in the coordinate transformation processing unit 22. Specifically, a camera input coordinate system is transformed into a decoder transformation coordinate system on the basis of a difference between the two decoders. Here, the "decoder" indicates software for obtaining the original data from data encoded based on a certain rule, by restoring the encoded data.

The coordinate transformation processing unit 22 receives the decoder transformation coordinate system from the inter-decoder transformation unit 21 as camera image data captured by the rear camera 1. Then, the coordinate transformation processing unit transfers each picture element of the camera image data onto the virtual stereoscopic imaging plane 9 of the virtual camera 8 according to a coordinate transformation using a mapping table stored and set in the ROM 23 in advance. Thereafter, the coordinate transformation processing unit generates monitor image data for obtaining a monitor image, wherein, the monitor image is an image projected on the virtual stereoscopic imaging plane 9 when the virtual projection plane 7 is viewed from the virtual camera 8.

The ROM 23 is a memory in which a mapping table is stored and set. The mapping table is generated by performing a coordinate transformation on the position of each picture element in a procedure of: designating the position of one picture element on the virtual stereoscopic imaging plane 9; determining a first corresponding position on the virtual projection plane 7, corresponding to the position of the designated picture element; and determining a second corresponding position on a real imaging plane 11 of the rear camera 1, corresponding to the first corresponding position.

When this mapping table is generated, a coordinate transformation is performed between the position of each picture element of a single set of camera image data captured by the rear camera 1, and the position of a corresponding picture element on the virtual stereoscopic imaging plane 9 of the virtual camera 8 through the virtual projection plane 7.

Figure 10A:
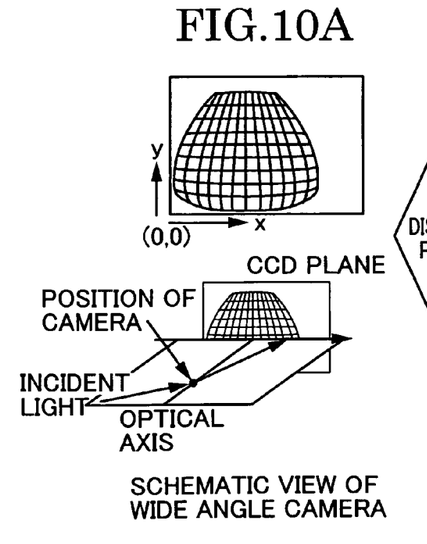
FIG. 10A is a schematic view of a wide angle camera illustrating a relationship between images before and after distortion processing, and a coordinate system.

Further, in order to generate the mapping table, a transformation relationship characteristic indicating a relationship between a distance of a picture element from the optical axis in a distorted image and a distance of a picture element from the optical axis in a non-distorted image is determined in advance (refer to FIG. 10A). Then, a real coordinate system for the position of each picture element of a single set of camera image data captured by the rear camera 1 is transformed into a coordinate system of the virtual stereoscopic imaging plane 9 by correcting a distortion of the real coordinate system by use of the distance from the optical axis and the transformation relationship characteristic of each picture element.

Further, for the mapping table, depending on the position (a, b) of the virtual camera 8 and the imaging plane tilt angle $\beta$, a plurality of mapping tables are stored and set for every predetermined positional interval and for every predetermined angular interval, so that fine positional setting and fine angular setting can be managed by employing, for example, an interpolation technique.

The RAM 24 is a memory in which rewritable information is stored and set. The Embodiment 1 is an example in which a coordinate transformation process is performed using the mapping table. For example, if the system of the Embodiment 1 is internally provided with hardware capable of arithmetic processing at high speed, and generates the monitor image data while performing the coordinate transformation in real time, coordinate transformation equations of each picture element and the like are stored and set in this RAM 24.

The encoder transformation unit 25 transforms the monitor image data, having been generated by the coordinate transformation processing unit 22, into image data to be displayed on the monitor 3, while also performing, for example, a left-right reversal process for a driver's viewpoint. Here, the "encoder" indicates software for encoding data based on a certain rule.

The monitor 3 is set on an instrument panel or the like, and displays a synthesis image of a downward display of a close view and a perspective display in the range from an intermediate view to a distant view, based on the image data from the image processing controller 2.

The virtual camera position adjustment operation knob 4 is an operation member with which the virtual camera 8 is set on an arbitrary spatial position by an external setting operation by the driver or other person. For this virtual camera position adjustment operation knob 4, the horizontal distance a (e.g., 2 m), from the rear camera 1, and the vertical distance b (e.g., 3 m), from the ground can be independently set.

The imaging plane angle adjustment operation knob 5 is an operation member with which the downward tilt angle β of the distant view imaging plane 92 to the close view imaging plane 91 is arbitrarily set (e.g., in an angular range of 30 to 100 degrees) by an external setting operation by the driver or other person.

Here, the virtual stereoscopic imaging plane 9 is adapted to be capable of setting a state in which the distant view imaging plane 92 thereof is set in parallel with the real imaging plane 11 of the rear camera 1 as a reference state, and of adjusting the downward tilt angle β from the reference state.

Next, an "image generating operation" will be described.

The image generating apparatus of the Embodiment 1 generates the monitor image data with a two-viewpoints transformation technique using the virtual camera 8, the virtual projection plane 7 (ground screen) and the virtual stereoscopic imaging plane 9, and thereby obtains a viewpoint shift image and a viewpoint rotation image, wherein, the viewpoint shift image is for a positioning assistance and safety confirmation assistance at the time of parking the vehicle, and the viewpoint rotation image is for safety confirmation assistance at the time of driving the vehicle backward.

More specifically, the camera image data on the range from the close view to the distant view is captured by the single real imaging plane 11 of the rear camera 1. Then, in the image processing controller 2, the virtual camera 8 is set at a higher position than the position of the rear camera 1. The virtual projection plane 7 is set on the ground as the virtual projection plane from the virtual camera 8. The virtual stereoscopic imaging plane 9 is set as the virtual imaging plane of the virtual camera 8, the virtual stereoscopic imaging plane including the close view imaging plane 91 parallel to the ground, and the distant view imaging plane 92 connected to a portion of the close view imaging plane 91 near the rear camera 1 and set at the predetermined downward tilt angle β. Further, in the image processing controller 2, the coordinate transformation is performed between the position of each picture element of the single set of camera image data captured by the rear camera 1, and the position of a corresponding picture element on the virtual stereoscopic imaging plane 9 of the virtual camera 8 through the virtual projection plane 7. According to this coordinate transformation, each picture element of the camera image data is mapped onto the virtual stereoscopic imaging plane 9 of the virtual camera 8, and monitor image data for obtaining a monitor image are generated, in which the monitor image is an image to be projected on the virtual stereoscopic imaging plane 9 when the virtual projection plane 7 is viewed from the virtual camera 8. In addition, on the monitor 3, a synthesis image, in which the downward image of the close view and the perspective image in the range from the intermediate view to the distant view are synthesized, is displayed, wherein both images are produced from the monitor image data generated by the image processing controller 2.

As described above, by performing the coordinate transformation, the monitor image data are generated from a single set of camera image data, which are captured by the rear camera 1. Consequently, unlike a conventional technology employing multiple sets of camera image data, extracting discriminative points and performing calibration to have continuity in a synthesis image is not necessary, and an arithmetic process in obtaining monitor image data having continuity can be simplified.

Further, when the virtual projection plane 7 set on the ground is viewed from the virtual camera 8, an image to be projected on the close view imaging plane 91 of the virtual stereoscopic imaging plane 9 becomes the downward image that the close view is viewed from above. Still further, when the virtual projection plane 7 set on the ground is viewed from the virtual camera 8, an image to be projected on the distant view imaging plane 92 of the virtual stereoscopic imaging plane 9 becomes a perspective image that a view in the range from the intermediate position to the distant position is viewed from obliquely above. In addition, since the close view imaging plane 91 and the distant view imaging plane 92 of the virtual stereoscopic imaging plane 9 are integrally connected, no discrepancy occurs at all between overview representation data of the close view and perspective display data of the distant view. Consequently, monitor image data to be generated are seamlessly connected.

The monitor image, which is obtained using the above-described monitor image data, is an image obtained by synthesizing the downward image of the close view with which a distance can be easily recognized, and the perspective image in the range from an intermediate view to the distant view, with which a perspective can be easily recognized in the sense that a distant object is viewed to be small while a nearby object is viewed to be large; and this synthesis image can be displayed on the screen of the monitor 3.

For this reason, without performing a selective operation on a downward image and a camera image, or without shifting an eye line on divided monitor displays, or without doing something similar, of images displayed on a single monitor screen, a viewpoint shift image (a downward image) provides a positioning assistance and a safety confirmation assistance at the time when parking a vehicle, and a viewpoint rotation image (a perspective image) provides a safety confirmation assistance at the time when driving the vehicle backward.

Subsequently, "a point of the Embodiment 1 of the present invention" will be described.

A point of the Embodiment 1 of the present invention is "to simultaneously and continuously display the downward image of the close view and the perspective image of the distant view, in which a distortion is corrected, by making the imaging plane of the virtual camera 8 stereoscopic". In order to do so, the virtual stereoscopic imaging plane 9 is introduced, and the viewpoint transformation is performed via the virtual projection plane 7 implemented by the ground screen.

Details of the viewpoint transformation technique of the Embodiment 1 will be given in the description of a "viewpoint transformation technique using a virtual stereoscopic imaging plane," to be described later, and an outline thereof is only given here.

In a schematic drawing of the Embodiment 1 of FIG. 2, a structure is illustrated wherein the real camera image is projected on the virtual projection plane 7 (ground screen), and that image is shot by the virtual stereoscopic imaging plane 9 of the virtual camera 8. According to this structure, the viewpoint transformation, in which the downward image of the close view is imaged on the close view imaging plane 91 of the virtual stereoscopic imaging plane 9 and the image of the intermediate view to the distant view is imaged on the distant view imaging plane 92 of the virtual stereoscopic imaging plane 9, is possible.

Figure 3A:
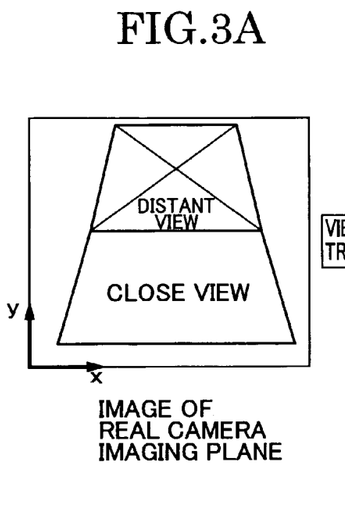
FIG. 3A is a schematic image view illustrating an image of a real camera imaging plane before a downward transformation is performed, in generation of a conventional downward image.
Figure 3B:
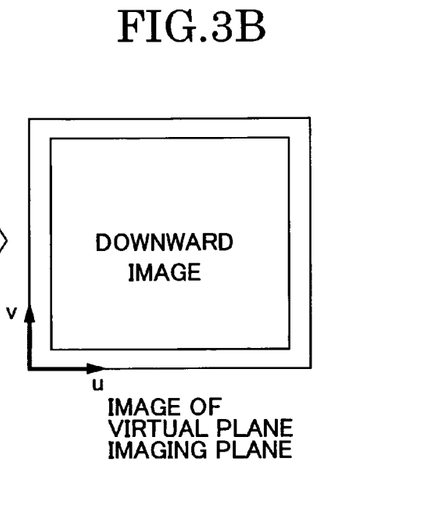
FIG. 3B is a schematic image view illustrating an image of a virtual plane imaging plane of a virtual camera after the downward transformation is performed, in the generation of the conventional downward image.

A feature of the invention depicted in the Embodiment 1 will be explained by a comparison between a conventional method which obtains only a downward image and a method according to the Embodiment 1, by using FIG. 3 and FIG. 4.

In the conventional method, a virtual imaging plane of the virtual camera is a plane surface, and is set to be in parallel with the ground as illustrated in FIG. 2. Therefore, only a downward image of a close view is generated (FIG. 3B) by a downward transformation from an image of a real camera imaging plane of the close view and a distant view (FIG. 3A).

Figure 4A:
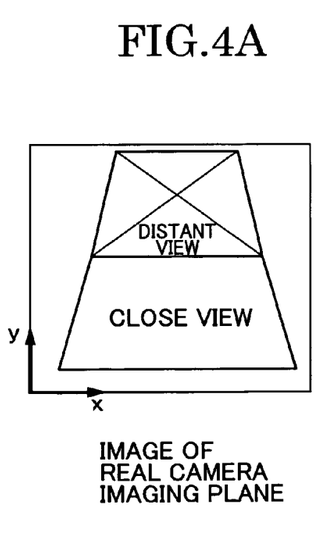
FIG. 4A is a schematic image view illustrating an image of a real camera imaging plane before a downward transformation is performed, in generation of a seamless image of a downward and a perspective of the Embodiment 1.
Figure 4B:
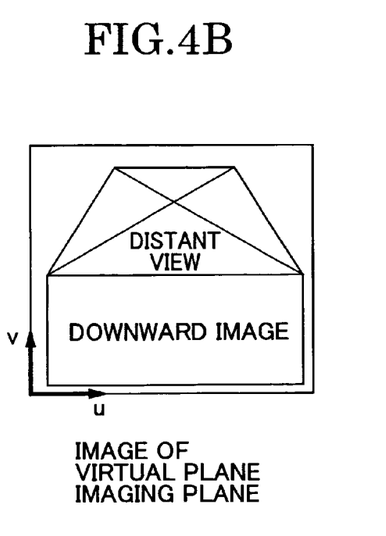
FIG. 4B is a schematic image view illustrating an image of a virtual plane imaging plane of a virtual camera by a downward image and a perspective-transformed distant image after the downward transformation is performed, in the generation of the seamless image of the downward and the perspective of the Embodiment 1.

In contrast, in a case where the virtual stereoscopic imaging plane 9 of the Embodiment 1 is used, the downward image of the close view by a downward transformation and the perspective image of the intermediate view to the distant view by a perspective transformation are continuously projected on the virtual stereoscopic imaging plane 9, from an image of a real camera imaging plane of the close view and the distant view (FIG. 4A). Here, (u, v) coordinate of FIG. 3 and FIG. 4 is a coordinate system along a surface of the virtual stereoscopic imaging plane 9.

As a result, the downward image of the close view and the oblique downward image having the perspective of the distant view are possible to be simultaneously and continuously displayed. In particular, when the distant view imaging plane 92 of the virtual stereoscopic imaging plane 9 and the real imaging plane 11 of the rear camera 1 are set to be in parallel as illustrated in FIG. 1 and FIG. 2, the distant image having the perspective same as that of the rear camera image is displayed (except for a distortion effect of a lens). Additionally, control of the perspective is possible by adjusting the imaging plane tilt angle $\beta$ of the virtual stereoscopic imaging plane 9.

As described in the foregoing, in the Embodiment 1, it is possible to seamlessly display the downward image of the close view and the perspective image of the intermediate view to the distant view. In addition, by controlling the imaging plane tilt angle $\beta$ of the virtual stereoscopic imaging plane 9 for that displaying, it is possible to control an effect of arbitrary changing an attachment tilt angle of the real camera for the intermediate view to the distant view.

Next, a "viewpoint transformation technique using the virtual stereoscopic imaging plane (in the case of a two-dimensional model)" will be described.

1. Background and Object

For an in-vehicle periphery monitor, there has been a demand from the beginning of development that a display of a downward view of a rear camera image, and an ordinary camera image are simultaneously displayed on the in-vehicle periphery monitor. To satisfy this demand, images have been shown through two-screen display when commercialization or demonstration of a product is made. Although outsiders sometimes have requested one-screen display, serious studies have been left out partly because there has been some doubt whether it is easy to view in practice.

On the present study of a "New Way of Displaying," the same demand as described above is also included in topics to be studied. In addition, the topics to be studied also include contents, which cannot be solved by the conventional viewpoint transformation techniques, such as the displaying of the images from the close view to the distant view, through a viewpoint transformation. In order to satisfy these demands all together, it has been decided that a highly extendable technique is to be newly developed by entirely changing a viewpoint transformation algorithm. A virtual stereoscopic screen technique using the virtual stereoscopic imaging plane to be described below is one of the results out of the study.

A feature of this technique resides in that a virtual imaging plane of a plane surface, which has been heretofore set parallel to the ground to obtain the downward image, is formed as a stereoscopic virtual imaging plane having a three-dimensional shape. Compared with conventional techniques, this technique differs from these techniques only in virtual imaging plane shape from a conceptual point of view, so it is an expansion that is easy to be understood. However, an algorithm to be implemented is completely different. This is because, based on the assumption of a specific plane, a simple algorithm has been heretofore used in which the same matrices are made to operate on all picture elements. However, to cope with a virtual imaging plane of arbitrary shape, a transformation equation possibly changes for every picture element, so that, for each time, a corresponding point is sought.

A first object of the following description is to sort out and release this technique. Incidentally, the shape of a stereoscopic imaging plane is highly arbitrary. In the following description, only one example is described. However, in the following description, a group of basic equations, which are necessary for calculating corresponding points, are sorted out and presented, and this group of basic equations is expected to be applied to stereoscopic imaging planes of other shapes. A second object of the following description is to comprehensively review a group of coordinate transformations which are necessary to implement the viewpoint transformation, and to sort out and present individual technologies. Since information of this kind represents peripheral-technical contents, no document has been heretofore available, and such information remains only in program codes in embedded form. However, since the procedure is complex to some extent, an obstacle arisen in implementation is hard to be overcome even when the principle of the viewpoint transformation is understood. In the latter half of the description, a group of necessary coordinate transformations are described.

2. Introduction to Virtual Stereoscopic Imaging Plane

FIG. 2 illustrates a concept of the viewpoint transformation using the virtual stereoscopic imaging plane (hereinafter referred to as "virtual stereoscopic CCD"). Arrows illustrated in FIG. 2 represent a flow of light on the concept. An image shot by the rear camera is projected on an external ground screen, and the image on the ground screen is shot by the virtual stereoscopic CCD. A base of the viewpoint transformation is to find a correspondence between the virtual CCD picture element and the rear camera CCD picture element with FIG. 2. If a virtual stereoscopic CCD having the same shape as a real substance were prepared, an image shot from a virtual position should be the same as an image obtained by shooting the substance from the virtual position. As a matter of course, an image on a blind area viewed from the rear camera CCD remains lost.

The virtual stereoscopic CCD illustrated in FIGS. 1 and 2 has a shape configured of two planes. Hence, it has a flexibility to a considerable degree as compared with the case where it has no flexibility if the CCD parallel to the ground is selected as the virtual stereoscopic CCD. Because of such flexibility, it is difficult to formulate the virtual CCD shapes of all types thereof. An example of a two-planes virtual stereoscopic CCD which is the same as that of FIGS. 1 and 2 will be described below, whereby its basic concept and a configuration technique will be described.

3. Transformation Procedure

A transformation procedure is opposite to the arrows of FIG. 2. That is, one point on the virtual stereoscopic CCD is designated: a corresponding point on the ground screen and a corresponding point on the rear camera CCD are found in this procedure. This is to seek corresponding points of the entire picture elements of an outputted image. Incidentally, on a coordinate system on the CCD plane, practical image processing is to consider the image processing in the coordinate system digitized by an encoder/decoder and the like. On the other hand, a machine dependency will come up so that it becomes difficult to be applied. Consequently, in the present description, a series of transformation procedures is described by use of a general coordinate system. To be used for a machine of specific type, an example using PICASSO will be described in the next chapter.

3.1 Definition of World Coordinate System

Figure 5:
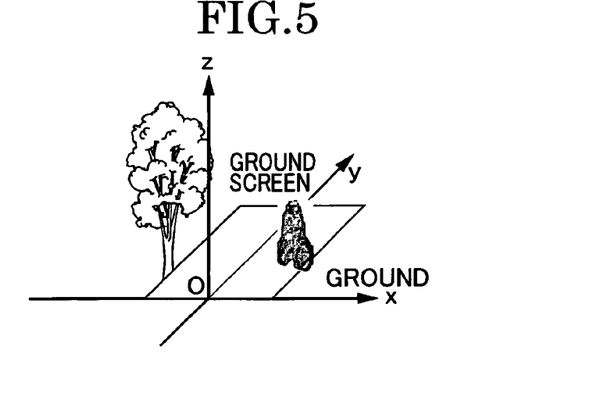
FIG. 5 is a view illustrating a world coordinate system in which a screen is represented by the ground.

The world coordinate system to be used in the present description uses a coordinate system in which the ground is a screen as illustrated in FIG. 5. Here, y-axis and z-axis of this coordinate system are switched as compared with a world coordinate system often used in three-dimensional graphics system.

3.2 Determination of Virtual CCD Plane

Figure 6A:
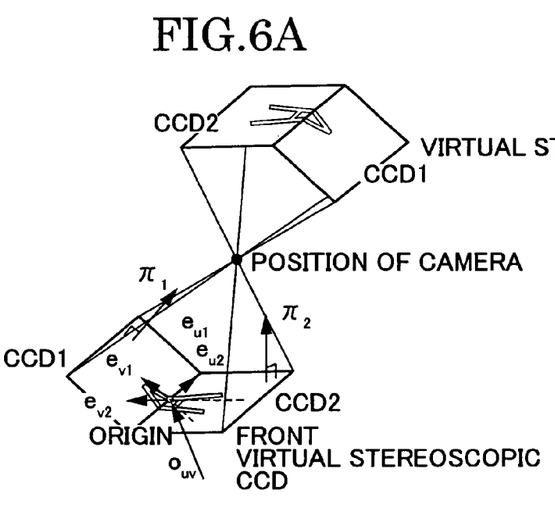
FIG. 6A is a perspective view schematically illustrating a virtual stereoscopic CCD.
Figure 6B:
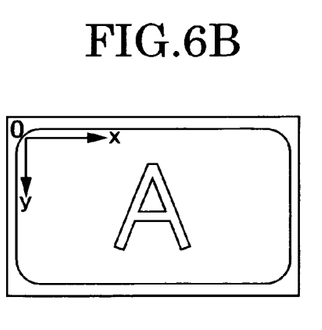
FIG. 6B is an example of a monitor display of the virtual stereoscopic CCD.

As described, at the beginning, on a definition of the virtual stereoscopic CCD, the virtual stereoscopic CCD is configured with a plurality of plane CCDs. Although there are several methods for the representation of the position of a picture element within a plane CCD, uv vectors are hereinafter used for the representation. One example is illustrated in FIG. 6A. In terms of optics, the virtual stereoscopic CCD behind the camera in the drawing represents an original CCD plane. Considering easiness of processing, however, in this description, it is discussed on a front virtual stereoscopic CCD that the CCD plane is rotated with respect to the camera position. For this reason, basis vectors {eu, ev} of the uv vectors are also defined on that plane. Incidentally, for a plurality of planes, the uv-basis vectors are set for each plane. For this example, the multiple uv-basis vectors are given by {eu1, ev1} and {eu2, ev2}. In addition, these basis vectors are vectors defined in the world coordinate system. Using these basis vectors, the position of a picture element on each CCDi plane is given by, $$u \cdot eu1 + v \cdot ev1 + Ouv \text{ for CCD1} \quad (1)$$

$$u \cdot eu2 + v \cdot ev2 + Ouv \text{ for CCD2} \quad (2)$$

Ouv is the position vector representing the position of the origin in the world coordinate system. A mutual transformation between coordinates (x, y) and coordinates (u, v) in a monitor display is a transformation from a two-dimensional image to another two-dimensional image, and this will be left to a designer. One embodiment will be described in the next section.

3.3 Determination of a Line-of-Sight Vector, and Corresponding Point on a Screen When the representations of the uv vectors are determined for a picture element, a line-of-sight vector from the position of the camera is determined as illustrated in FIG. 6A, and a point at which this line-of-sight vector points is determined on the ground screen. To seek this point is an operation in which an intersection of a straight line and a plane is sought; and it is not so difficult to work with.

3.4 How to Give Stereoscopic CCD

How an image is displayed on a monitor varies depending on the shape of the virtual stereoscopic CCD. When the obliquely-set CCD plane of the virtual stereoscopic CCD and the rear camera CCD are set to be the same in angles, the images generated by the virtual stereoscopic CCD has the following features:

the distant image is displayed as a camera image at a designated angle;
the close view is displayed as the downward image; and
the downward image and the distant image are continuously connected.

As a result, when the obliquely-set CCD plane of the virtual stereoscopic CCD is adjusted from the angle of the rear camera CCD, the same distant image as that at the time when the elevation angle of the rear camera is changed is obtained.

3.5 Projection from Stereoscopic Screen onto Stereoscopic CCD

Figure 7:
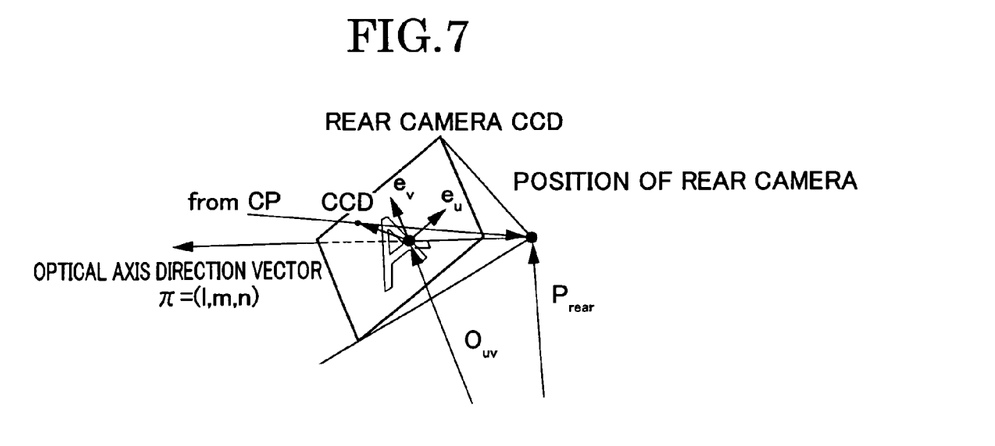
FIG. 7 is a view illustrating various definitions around a rear camera CCD.

One point on the ground screen is designated. The next problem is to seek a corresponding point on the rear camera CCD as illustrated in FIG. 7, and, more specifically, to seek an intersection formed by a straight line (a line-of-sight) and a CCD plane. Eventually, this problem is to seek an intersection of a plane and a straight line, and is the same in principle as that in Sec. 3.2 except that the CCD and the screen are interchanged. However, the difference exits in that a representation to be eventually sought is not in the form of three dimensional position vector, but in the form of (u, v) coordinate system on the CCD surface. Accordingly, as illustrated in FIG. 7, the CCD surface is represented using {eu, ev}. The expression is the same as that used in Sec. 3.1, but this is defined hereinafter on the surface of the rear camera CCD.

Although there are several methods on determination of the basis vectors on the rear camera CCD, adjustable procedures are desired since adjusting them into the real rear camera is necessary. Hereinafter, two methods will be described. However, it is assumed that optical effects such as distortion of lens are completely eliminated, and the rear camera is handled as a pinhole camera.

3.5.1 Determination of Rear Camera {eu, ev}

First, on determination of {eu, ev}, a method for designating a line-of-sight of a camera, and another method for designating with a rotation matrix, which has been performed, will be described.

3.5.2 Projection onto Rear Camera CCD

Using {eu, ev} determined using the above result, the CCD vector of FIG. 7 can be expressed as follows:

$$CCD = u \cdot e_u + v \cdot e_v \quad (3)$$

At this time, obtaining (u, v) values is desired, the values being corresponding to the intersection CP (refer to FIG. 7B) obtained in Sec. 3.2. The (u, v) values are obtained by solving the above equation together with the equation below.

$$CCD = t \cdot (P_{rear} - CP) + P_{rear} - O_{uv} \quad (4)$$

Incidentally, Ouv is a position vector in three dimensions that represents the origin on the CCD plane in the world coordinate system. Only a result is described as follows:

$$CCD = \frac{(O_{u_v} - P_{rear}) \cdot (e_u \times e_v)}{(P_{rear} - CP) \cdot (e_u \times e_v)} (P_{rear} - CP) + P_{rear} - O_{u_v} \quad (5)$$

$$u = e_u \cdot CCD \quad (6)$$

$$v = e_v \cdot CCD \quad (7)$$

Wherein, Prear represents the position of the rear camera, and an operator x represents the cross product of three-dimensional vectors. Since correspondences between the (u, v) values and an actual camera image depend on image coordinates of a camera system, they cannot be described in general. Accordingly, in the next chapter, an example of transformation in the case where a specific machine is used will be described.

3.6 Summary of Virtual Stereoscopic Screen

This chapter presents the principle and its basic equations of the viewpoint transformation using the virtual stereoscopic CCD, along the flow of the processes of the viewpoint transformation. The present technique enables "simultaneous displays of the downward image and the perspective image," which is not possible with the conventional technique. Accordingly, the flexibility of representation has been increased. However, the flexibility is thus high, and accordingly further understanding is required for generating downward data.

4. Real Camera Image and Correspondence

Figure 8:
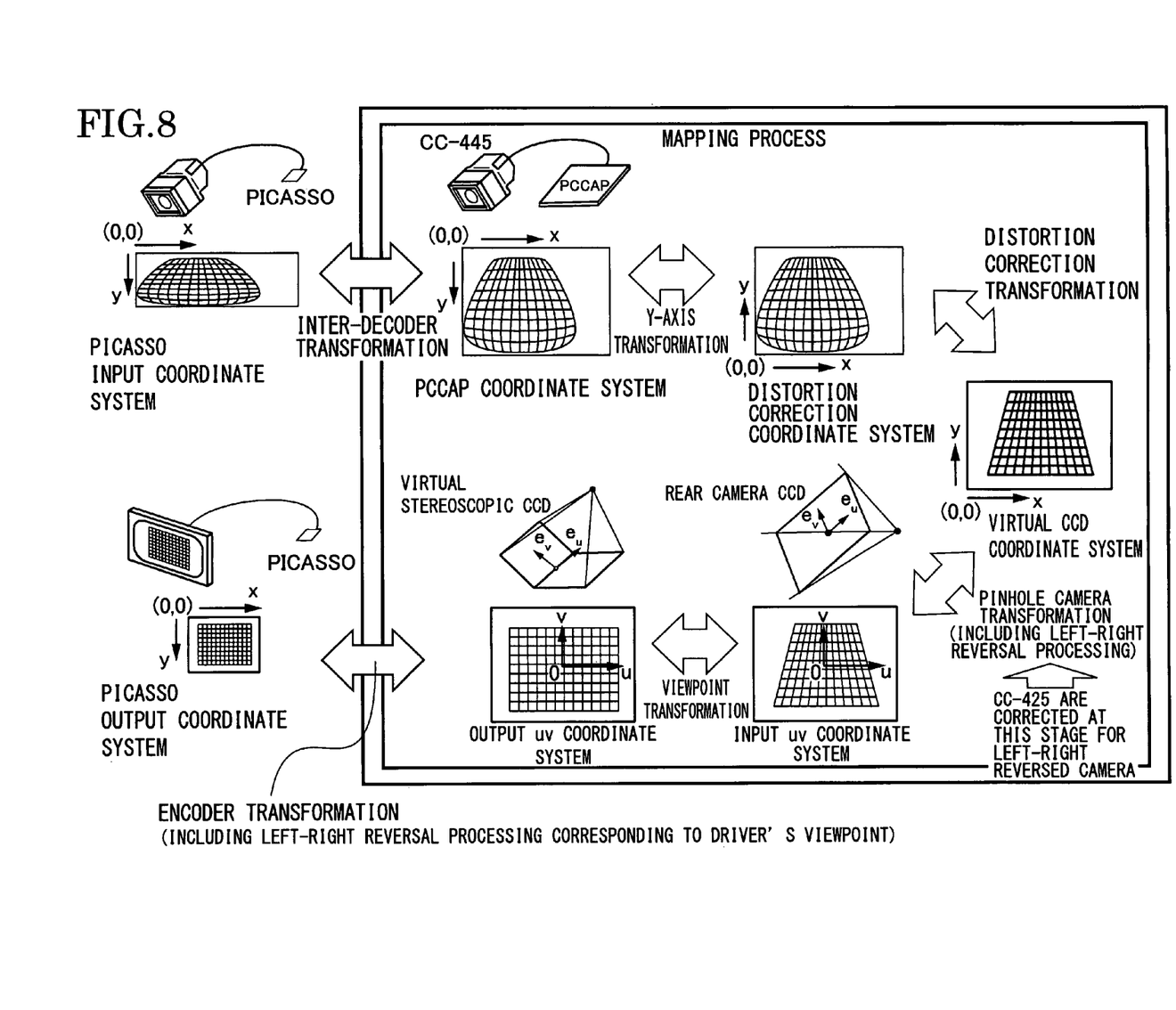
FIG. 8 is a view illustrating interactions in various coordinate transformations.

FIG. 8 illustrates a whole picture of a mutual transformation process to be described in this chapter. A series of processes here also includes a distortion correction process so as to adapt the transformation process of the preceding section assuming the use of the pinhole camera to characteristics of a wide angle camera. More specifically, six transformations illustrated by arrows of FIG. 8, i.e., inter-decoder transformation;
y-axis transformation;
distortion correction transformation;
pinhole camera transformation;
viewpoint transformation; and
encoder transformation, are performed in procedure to calculate corresponding points. In the preceding section, only the "viewpoint transformation" has been described. Accordingly, the transformation processes other than viewpoint transformation will be described in this chapter. Incidentally, in this description, an embodiment using the following, camera: CC-445 (manufactured by Clarion Co., Ltd.)
decoder: PCCAP (manufactured by I-O DATA DEVICE INC.) will be described below.

4.1 Inter-Decoder Transformation

This transformation interchanges decoder performance of a video capture card PCCAP (manufactured by I-O DATA DEVICE INC.) and decoder performance of PICASSO. PCCAP is hardware which is used when a distortion correction technology is developed, and a correction coefficient has been determined in this coordinate system so that it needs to be used in the foreseeable future. A simplest transformation is to multiply a length and a width by a ratio of resolution, so that coordinate values are caused to correspond. However, this correspondence is an approximate one, so discrepancies definitely occur.

Image cut-out regions cut out from an NTSC signal are different between the PCCAP decoder and the PICASSO decoder. From an empirical point of view, out of positions on the order of a few percentages commonly exist. When all data are prepared, the following processes may be considered:

compare decoder performances and determine which one to be used; and
capture the same camera image using the decoders, and compare the captured images.

However, the above processes cannot be performed unfortunately since:

no performance data are available for both decoders, PCCAP and PICASSO; and
digital image data of PICASSO cannot be taken out.

Although a measure to be taken uses complex procedures, a method is under development in which simultaneous equations are solved with respect to three mutual transformations along with encoder performance of a PICASSO power range system. At this time, so that internal coordinate system can be measured from outside, a superimpose function of PICASSO is used concomitantly. A presently proven transformation equation is only a result that has been adjusted using an evaluation board (an external decoder) under the development of PICASSO.

4.2 y-Axis Transformation

This is a transformation in which an origin is set above or below. A coordinate system is used in which an origin is set below when the distortion correction technology is developed. A transformation is performed simply with the number of picture elements in the y-axis.

4.3 Distortion Correction Transformation

Figures 9A, 9B:
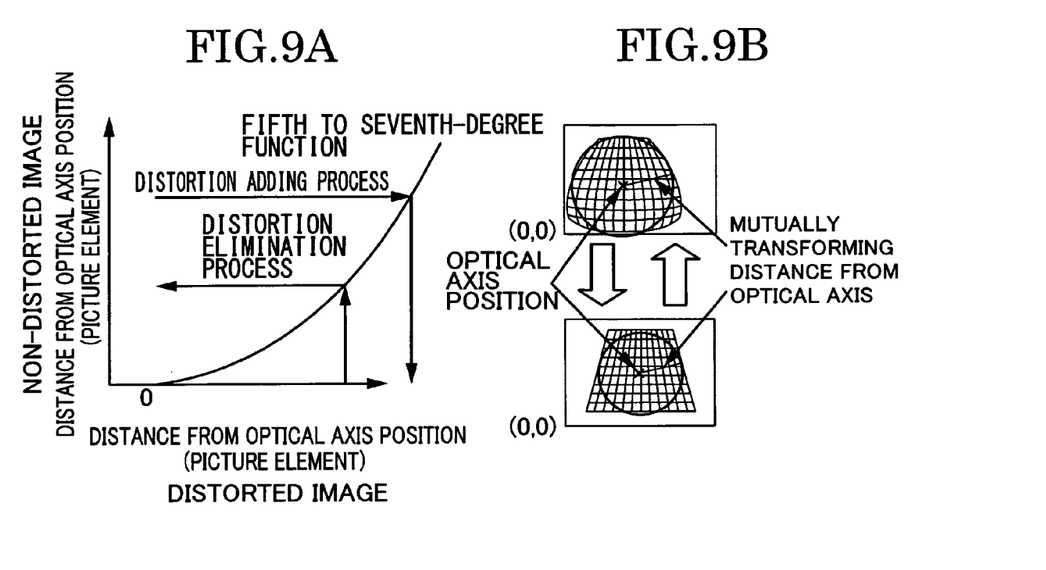
FIG. 9A is a view illustrating an example of a function of an amount of transformation to be used in a distortion correction.
FIG. 9B is a view illustrating a mutual transformation of a distance from an optical axis to be transformed by the amount of transformation being used in the distortion correction.

A present distortion correction technology processes bit-map images (resolution 640×480) before and after performing distortion correction in a non-dimensional picture element space, the bit-map images being captured by PCCAP (manufactured by I-O DATA DEVICE INC.). As illustrated in FIG. 9B, in the principle of this transformation process, a distance from the position of the optical axis of each picture element is only changed. As illustrated in a graph of FIG. 9A, an amount of transformation is represented by a monotone increasing function of high order, and experimentally determined in advance. From an empirical point of view, on Clarion manufactured cameras, the positions of optical axes fluctuate on the order of a few percentages even in the same lot. When the amount of fluctuation is not small, an image process to be performed along a peripheral part of an image on which a rate of distortion is high is influenced. Consequently, a peripheral part had better not be transformed.

4.4 Pinhole Camera Transformation

Figure 10B:
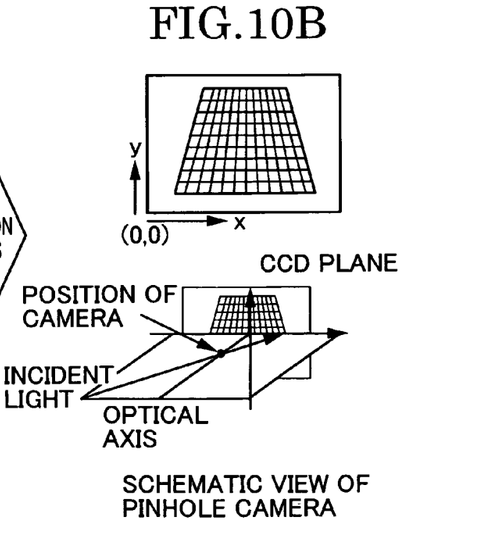
FIG. 10B is a schematic view of a pinhole camera illustrating a relationship between images before and after the distortion processing, and a coordinate system.

The distortion correction image transformation is the non-dimensional process, and introduces a physical quantity so that a captured image is caused to correspond to an image on the virtual CCD plane in the world coordinate system. FIG. 10 illustrates a concept at that time. Images before and after performing the distortion correction in the drawing have the same resolution 640×480 as that of the preceding section, but corresponding camera models are different as seen from schematic view of FIG. 10.

In the schematic view of a wide angle camera illustrated in FIG. 10A, the position of the optical axis is not at the center of an image. There has been no case where the position of the optical axis is at the center, according to experiments conducted up to now using our company's camera. The "position of the camera" on the optical axis in the drawing represents a focal length from the CCD plane, and also corresponds to the position of a lens. This drawing depicts a state in which oblique incident light refracts on the position of the camera (lens) and forms an image on the CCD plane, and as a result, a distorted image is formed.

Meanwhile, the schematic view of a pinhole camera illustrated in FIG. 10B is different. Compared with the schematic view of the wide angle camera, a physical size of the CCD is drawn somewhat larger, and the focal length is shorter. In addition, incident light is drawn so that an image does not refract, and linearly forms an image on the CCD plane. From this schematic view, it is understood that, for example, even when setting the size (or pixel size) of the CCD plane to be larger, if the focal length is set longer in the same proportion, the same image of the same resolution can be obtained. That is, the scale setting of the pinhole camera is free to be made so long as the same ratio is retained unless some special event occurs. From this schematic view, camera constants necessary for calculating corresponding points are as follows:

the position of the optical axis on the virtual CCD plane;
focal length f on the virtual CCD; and
pixel size (Wx, Wy) of the virtual CCD.

For the sake of simplicity, the position of the optical axis is set at the center (319.5, 239.5) of the image in the drawing. However, the pinhole camera is a virtual one, and hence it is free to set the center at any place. On the latter two items, an absolute value itself is not very important as previously described.

Figure 11A:
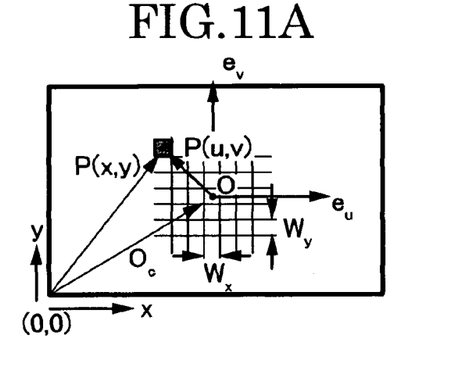
FIG. 11A is a view illustrating a correlation between a virtual CCD picture element (x, y) and a world coordinate system (u, v).
Figure 11B:
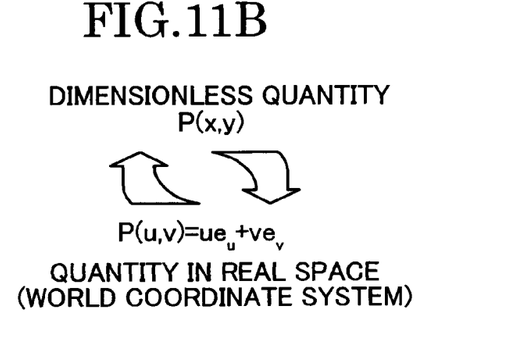
FIG. 11B is a view illustrating mutual transformation of a dimensionless quantity and a quantity in a real space between the virtual CCD picture element (x, y) and the world coordinate system (u, v).

Using these setting values of the virtual CCD, and considering a relationship illustrated in FIG. 11, transformation processing into the world coordinate system is performed using the following equation:

$$\begin{pmatrix} u \\ v \end{pmatrix} = (W_x \quad W_y) \left[ \begin{pmatrix} x \\ y \end{pmatrix} - O_c \right] \quad (8)$$

where (Wx, Wy) denote pixel sizes of the virtual CCD (Wx=Wy, in general); and Oc denotes the optical center of the virtual CCD (arbitrary, but at the center of an image in general). Incidentally, as described in Sec. 3.2, the basis vectors {eu, ev} are generally normalized to those with unit lengths in the world coordinate system. In that case, (Wx, Wy) has a meaning as the pixel sizes of the virtual CCD. Unless the basis vectors are not normalized in the world coordinate system, these values do not represent pixel sizes, but represent proportional coefficients.

Further, for an in-vehicle rear camera, a left-right reversal process of:

$$-u \Rightarrow u \quad (9)$$

is frequently necessary. In general, a rear camera image is outputted as a left-right reversed image, and the same is true for CC-445.

4.5 Viewpoint Transformation

Since this viewpoint transformation has been described in Chap. 3, a further description thereof is omitted.

4.6 Encoder Transformation

This encoder transformation is related to design of an outputted image, and thus a general equation cannot be presented. However, for the case where displaying is simply performed on the center of an image at, for example, a constant scale, the following equation is given, $$\begin{pmatrix} x \\ y \end{pmatrix} = \alpha \cdot \begin{pmatrix} u \\ -v \end{pmatrix} + SC \quad (10)$$

where α denotes a scale constant, and SC denotes the center of an outputted image (in FIG. 8, SC=(179.5, 119.5)). It should be noted here that when a rear camera image is outputted, a left-right reversal is sometimes requested for a driver's viewpoint. In that case, a left-right reversal process is performed as pointed out in Sec. 4.4. At that time, before the above process, the following process is performed, $$u \Rightarrow -u \quad (11)$$

or after the process, a left-right reversal process needs to be performed. In the case of the latter process, attention needs to be paid when the optical axis, which is left-right asymmetric, is set and a picture is generated.

Incidentally, depending on the combination of encoder performance and monitor performance, a center point of an encoder coordinate system is not necessarily a center point on an output monitor, so that, in many cases, it is adjusted using SC in the above equation.

5. Conclusions

In this description, the following has been described:
the concepts of the stereoscopic CCD;
the principle of the viewpoint transformation technique using the two-plane models
the whole image of a group of coordinate transformations; and
the concept and technique of each transformation process.

In this description, all transformation equations are presented, and a mapping table should be able to be generated if the described procedure is followed.

Next, effects will be described.

Effects described below can be obtained for the image generating apparatus and the image generating method of the Embodiment 1.

(1) A rear camera 1 which captures camera image data projected onto a single real imaging plane 11 and ranging from a close view to a distant view; an image processing controller 2 which sets a virtual camera 8 at a position higher than the rear camera 1, which sets a virtual projection plane 7 from the virtual camera 8 on ground, which sets a virtual stereoscopic imaging plane 9, as a virtual imaging plane of the virtual camera 8, including a close view imaging plane 91 parallel to the ground and a distant view imaging plane 92 connected to a side of the close view imaging plane 91 near from the rear camera 1 and set to have a predetermined downward tilt angle β, which performs a coordinate transformation between a position of each picture element of the single camera image data captured by the rear camera 1 and a position of each picture element on the virtual stereoscopic imaging plane 9 of the virtual camera 8 through the virtual projection plane 7, which transfers the each picture element of the camera image data onto the virtual stereoscopic imaging plane 9 of the virtual camera 8 according to the coordinate transformation, and which generates monitor image data for obtaining a monitor image, the monitor image being as an image to be projected on the virtual stereoscopic imaging plane 9 when the virtual projection plane 7 is viewed from the virtual camera 8; and a monitor 3 which displays a synthesis image in which a downward image of the close view and a perspective image of an intermediate view to the distant view projected by the monitor image data generated by the image processing controller 2 are synthesized, are included. Therefore, it is possible to provide the image generating apparatus which generates the monitor image data where the downward display for the close view and the perspective display for the intermediate-to-distant view are seamlessly joined, while simplifying calculation processes.

(2) The image processing controller 2 sets the distant view imaging plane 92 of the virtual stereoscopic imaging plane 9 of the virtual camera 8 to be in parallel with the real imaging plane 11 of the rear camera 1. Therefore, it is possible to generate the monitor image data which displays the distant view image having the perspective same as that of the real camera image.

(3) A mapping table is generated by performing a coordinate transformation of a position of each picture element in an order of: designating one position of the picture element on the virtual stereoscopic imaging plane 9 of the virtual camera 8; determining a first corresponding position on the virtual projection plane 7, corresponding to the designated one position of the picture element; and determining a second corresponding position on the real imaging plane 11 of the rear camera 1, corresponding to the first corresponding position, and the image processing controller 2 performs a coordinate transformation, by using the mapping table, between the position of the each picture element of the single camera image data captured by the rear camera 1 and the position of the each picture element on the virtual stereoscopic imaging plane 9 of the virtual camera 8. Therefore, it is possible to display an image on the monitor 3 at high speed by means of a map search instead of performing calculation processes for coordinate transformation involving a large amount of calculation, and also possible to find corresponding points for all picture elements on the virtual stereoscopic imaging plane 9, which become an output image to the monitor 3.

For example, when the position of one single picture element on the real imaging plane 11 of the rear camera 1 is designated, and corresponding points on the virtual stereoscopic imaging plane 9 are eventually designated, corresponding points for all the picture elements cannot be obtained in some cases since expansion/contraction occurs due to a transformation into a downward image. Meanwhile, by designating, in advance, the position of one picture element on the virtual stereoscopic imaging plane 9 of the virtual camera 8, the corresponding points for all the picture elements on the virtual stereoscopic imaging plane 9, which become an output image to the monitor 3, can be obtained.

(4) A transformation relationship characteristic indicating a relationship between a distance of a picture element from an optical axis by a distorted image of the camera image data and a distance of a picture element from an optical axis by a non-distorted image of the camera image data is determined in advance, and the image processing controller 2 corrects a distortion of a coordinate system of the position of the each picture element of the single camera image data captured by the rear camera 1, by using the distance of the each picture element from the optical axis and the transformation relationship characteristic, to transform it into a coordinate system of the virtual stereoscopic imaging plane 9. Therefore, by performing a simple correction transformation using the amount-of-transformation relationship characteristic, a distortion of an image caused by a camera lens is corrected, and the perspective image of the distant view being linearly drawn can be obtained as in an image screen of a pinhole camera.

(5) A virtual camera setting operation member 4 connected with the image processing controller 2 and which sets the virtual camera on an arbitrary spatial position in accordance with an external operation is further included. Therefore, a balance between the downward image of the close view to be displayed on the lower part of a monitor screen and the perspective image of the distant view to be displayed on an upper part thereof is suitably adjusted.

(6) A virtual stereoscopic imaging plane setting operation member 5 connected with the image processing controller 2 and which arbitrarily sets the downward tilt angle β of the distant view imaging plane 92 to the close view imaging plane 91 in accordance with an external operation is further included. Therefore, the flexibility of a design on a monitor screen can be increased, thus allowing a perspective image of the distant view to have a design which causes a perspective to be markedly displayed, a design which gives a strong stereoscopic effect, and the like.

(7) The real camera includes the rear camera 1 attached to a rear part of a vehicle and which images a view behind the vehicle. Therefore, an synthesis image produced from the downward image for the close view to be displayed on a lower part, and the perspective image for the intermediate-to-distant view is displayed on a monitor whereby circumstances around a rear part of the vehicle including a sense of distance and a perspective will be shown, thus assisting driving.

(8) Capturing camera image data projected onto a single real imaging plane 11 of a rear camera 1 and ranging from a close view to a distant view; setting a virtual camera 8 at a position higher than the rear camera 1; setting a virtual projection plane 7 of the virtual camera 8 on ground; setting a virtual stereoscopic imaging plane 9, as a virtual imaging plane of the virtual camera 8, including a close view imaging plane 91 parallel to the ground and a distant view imaging plane 92 connected to a side of the close view imaging plane 91 near from the rear camera 1 and set to have a predetermined downward tilt angle β; performing a coordinate transformation between a position of each picture element of the single camera image data captured by the rear camera 1 and a position of each picture element on the virtual stereoscopic imaging plane 9 of the virtual camera 8 through the virtual projection plane 7; generating monitor image data for obtaining a monitor image, the monitor image being as an image to be projected on the virtual stereoscopic imaging plane 9 when the virtual projection plane 7 is viewed from the virtual camera 8, by transferring the each picture element of the camera image data onto the virtual stereoscopic imaging plane 9 of the virtual camera 8 according to the coordinate transformation; and displaying on a monitor a synthesis image in which a downward image of the close view and a perspective image of an intermediate view to the distant view projected by the generated monitor image data are synthesized, are included. Therefore, it is possible to provide the image generating method which generates the monitor image data where the downward display for the close view and the perspective display for the intermediate-to-distant view are seamlessly joined, while simplifying calculation processes.

(9) The distant view imaging plane 92 of the virtual stereoscopic imaging plane 9 of the virtual camera 8 is set to be in parallel with the real imaging plane 11 of the rear camera 1. Therefore, it is possible to generate the monitor image data which displays the distant view image having the perspective same as that of the real camera image.

(10) A mapping table is generated by performing a coordinate transformation of a position of each picture element in an order of: designating one position of the picture element on the virtual stereoscopic imaging plane 9 of the virtual camera 8; determining a first corresponding position on the virtual projection plane 7, corresponding to the designated one position of the picture element; and determining a second corresponding position on the real imaging plane 11 of the rear camera 1, corresponding to the first corresponding position, and a coordinate transformation, by using the mapping table, between the position of the each picture element of the single camera image data captured by the rear camera 1 and the position of the each picture element on the virtual stereoscopic imaging plane 9 of the virtual camera 8 is performed. Therefore, the displaying of an image on the monitor 3 is enabled at high speed by means of a map search instead of performing calculation processes for the coordinate transformation involving a large amount of calculation, and the seeking of corresponding points for all picture elements on the virtual stereoscopic imaging plane 9, which will become an output image to the monitor 3, is also enabled.

For example, when the position of a single picture element on the real imaging plane 11 of the rear camera 1 is designated, and corresponding points on the virtual stereoscopic imaging plane 9 are eventually determined, corresponding points for all the picture elements cannot be obtained in some cases since expansion/contraction occurs due to a transformation into the downward image. Meanwhile, by designating in advance the position of a single picture element on the virtual stereoscopic imaging plane 9 of the virtual camera 8, corresponding points for all the picture elements on the virtual stereoscopic imaging plane 9, which will become an output image to the monitor 3, can be obtained.

(11) A transformation relationship characteristic indicating a relationship between a distance of a picture element from an optical axis by a distorted image of the camera image data and a distance of a picture element from an optical axis by a non-distorted image of the camera image data is determined in advance, and a distortion of a coordinate system of the position of the each picture element of the single camera image data captured by the rear camera 1 is corrected, by using the distance of the each picture element from the optical axis and the transformation relationship characteristic, to transform it into a coordinate system of the virtual stereoscopic imaging plane 9. Therefore, by performing the simple correction transformation using the amount-of-transformation relationship characteristic, a distortion of an image caused by a camera lens is corrected, and the perspective image of the distant view being linearly drawn can be obtained as in an image screen of a pinhole camera.

(12) Setting the virtual camera 8 on an arbitrary spatial position in accordance with an external operation to a virtual camera setting operation member 4 is further included. Therefore, a balance between the downward image of the close view to be displayed on a lower part of a monitor screen, and the perspective image of the distant view to be displayed on an upper part thereof is suitably adjusted.

(13) Setting the downward tilt angle β of the distant view imaging plane 92 to the close view imaging plane 91 in accordance with an external operation to a virtual stereoscopic imaging plane setting operation member 5 is further included. Therefore, the flexibility of a design on the monitor screen can be increased, thus allowing the perspective image of the distant view to have a design which causes a perspective to be markedly displayed, a design which gives a strong stereoscopic effect, and the like.

(14) The camera image data is captured by the rear camera 1 attached to a rear part of a vehicle and which images a view behind the vehicle. Therefore, the synthesis image produced from the downward image of the close view to be displayed on a lower part, and the perspective image of the intermediate-to-distant view is displayed on the monitor, whereby circumstances around a rear part of the vehicle including a sense of distance and a perspective will be shown, thus assisting driving.

As described above, the image generating apparatus and method of the present invention have been described based on the Embodiment 1; however, a specific configuration is not limited to the Embodiment 1. Various changes or additions are tolerated without departing from the scope of the invention according to each claim of the Patent Claims.

In the Embodiment 1, the single rear camera is disposed, and the coordinate transformation is performed on the position of each picture element of the single piece of the camera image data captured by the single rear camera, so that monitor image data are generated. This is to clarify a feature of the invention, which uses the single piece of camera image data from the real camera, so only the single in-vehicle camera has been used in the Embodiment 1. Accordingly, the description of the Embodiment 1 is not to limit the number of cameras to only one, but one real camera and one or a plurality of auxiliary cameras may be disposed. For example, on the downward image, there are some cases that images on dead zones (both ends) are missed, and in this case, the images on dead zones may be compensated by using an image from another in-vehicle camera (auxiliary camera).

In the Embodiment 1, as the monitor display image, the image has been produced by seamlessly jointing the downward display image of the close view and the perspective display image from the intermediate-to-distant view. However, for example, the monitor display image may be one which a partition line is provided between the downward display image of the close view and the perspective display image from the intermediate-to-distant view. That is, the present invention is to generate the monitor image data with which the overhead display image of the close view and the perspective display image from the intermediate-to-distant view are seamlessly jointed, and not to define a condition of joining, even to the extent of, the monitor display images generated based on the monitor image data. For example, considering visibility, design, and the like, the overhead image and the perspective image based on the generated monitor image data are incorporated into a base image on which a partition line, a frame, and the like are formed in advance, and the synthesis image of both images may be displayed on the monitor.

In the Embodiment 1, as an imaging device of the real camera, the CCD has been used, but a CMOS and the like may be used instead.

In the Embodiment 1, an example of applying it to the rear camera mounted on a vehicle has been described. However, it can be also applied to a side camera or a front camera to be mounted on the vehicle. In addition, it can be applied to a monitoring camera disposed in a store or the like other than on the vehicle. When it is applied to the monitoring camera, great advantage exists in that the number of cameras and monitors to be disposed can be reduced to a large extent.

What is claimed is:

1. An image generating apparatus, comprising:
   a real camera which captures camera image data projected onto a single real imaging plane and ranging from a close view to a distant view;
   an image processing controller
   which sets a virtual camera at a position higher than the real camera,
   which sets a virtual projection plane from the virtual camera on ground, which sets a virtual stereoscopic imaging plane, as a virtual imaging plane of the virtual camera, including a close view imaging plane parallel to the ground and a distant view imaging plane connected to a side of the close view imaging plane near from the real camera and set to have a predetermined downward tilt angle relative to the ground,
   which performs a coordinate transformation between a position of each picture element of the single camera image data captured by the real camera and a position of each picture element on the virtual stereoscopic imaging plane of the virtual camera through the virtual projection plane,
   which transfers the each picture element of the camera image data of the close view onto the close view imaging plane and transfers the each picture element of the camera image data of the distant view connected to the each picture element of the camera image data of the close view onto the distant view imaging plane connected to the close view imaging plane and tilted relative to the ground according to the coordinate transformation, and
   which generates monitor image data for obtaining a monitor image, the monitor image being as an image to be projected on the virtual stereoscopic imaging plane when the virtual projection plane is viewed from the virtual camera; and
   a monitor which displays a synthesis image in which a downward image of the close view and a perspective image of an intermediate view to the distant view projected by the monitor image data generated by the image processing controller are synthesized.

2. The image generating apparatus according to claim 1, wherein the image processing controller sets the distant view imaging plane of the virtual stereoscopic imaging plane of the virtual camera to be in parallel with the real imaging plane of the real camera.

3. The image generating apparatus according to claim 1,
wherein a mapping table is generated by performing a coordinate transformation of a position of each picture element in an order of:
designating one position of the picture element on the virtual stereoscopic imaging plane of the virtual camera;
determining a first corresponding position on the virtual projection plane, corresponding to the designated one position of the picture element; and
determining a second corresponding position on the imaging plane of the real camera, corresponding to the first corresponding position, and
wherein the image processing controller performs a coordinate transformation, by using the mapping table, between the position of the each picture element of the single camera image data captured by the real camera and the position of the each picture element on the virtual stereoscopic imaging plane of the virtual camera.

4. The image generating apparatus according to claim 1,
wherein a transformation relationship characteristic indicating a relationship between a distance of a picture element from an optical axis by a distorted image of the camera image data and a distance of a picture element from an optical axis by a non-distorted image of the camera image data is determined in advance, and
wherein the image processing controller corrects a distortion of a coordinate system of the position of the each picture element of the single camera image data captured by the real camera, by using the distance of the each picture element from the optical axis and the transformation relationship characteristic, to transform it into a coordinate system of the virtual stereoscopic imaging plane.

5. The image generating apparatus according to claim 1, further comprising a virtual camera setting operation member connected with the image processing controller and which sets the virtual camera on an arbitrary spatial position in accordance with an external operation.

6. The image generating apparatus according to claim 1, further comprising a virtual stereoscopic imaging plane setting operation member connected with the image processing controller and which arbitrarily sets the downward tilt angle of the distant view imaging plane to the close view imaging plane in accordance with an external operation.

7. The image generating apparatus according to claim 1, wherein the real camera includes a rear camera attached to a rear part of a vehicle and which images a view behind the vehicle.

8. An image generating method, comprising:
capturing camera image data projected onto a single real imaging plane of a real camera and ranging from a close view to a distant view;
setting a virtual camera at a position higher than the real camera;
setting a virtual projection plane of the virtual camera on ground;
setting a virtual stereoscopic imaging plane, as a virtual imaging plane of the virtual camera, including a close view imaging plane parallel to the ground and a distant view imaging plane connected to a side of the close view imaging plane near from the real camera and set to have a predetermined downward tilt angle relative to the ground;
performing a coordinate transformation between a position of each picture element of the single camera image data captured by the real camera and a position of each picture element on the virtual stereoscopic imaging plane of the virtual camera through the virtual projection plane;
generating monitor image data for obtaining a monitor image, the monitor image being as an image to be projected on the virtual stereoscopic imaging plane when the virtual projection plane is viewed from the virtual camera, by transferring the each picture element of the camera image data of the close view onto the close view imaging plane and transferring the each picture element of the camera image data of the distant view connected to the each picture element of the camera image data of the close view onto the distant view imaging plane connected to the close view imaging plane and tilted relative to the ground according to the coordinate transformation; and
displaying on a monitor a synthesis image in which a downward image of the close view and a perspective image of an intermediate view to the distant view projected by the generated monitor image data are synthesized.

9. The image generating method according to claim 8, wherein the distant view imaging plane of the virtual stereoscopic imaging plane of the virtual camera is set to be in parallel with the real imaging plane of the real camera.

10. The image generating method according to claim 8, wherein
a mapping table is generated by performing a coordinate transformation of a position of each picture element in an order of:
designating one position of the picture element on the virtual stereoscopic imaging plane of the virtual camera;
determining a first corresponding position on the virtual projection plane, corresponding to the designated one position of the picture element; and
determining a second corresponding position on the imaging plane of the real camera, corresponding to the first corresponding position, and
wherein the method performs a coordinate transformation, by using the mapping table, between the position of the each picture element of the single camera image data captured by the real camera and the position of the each picture element on the virtual stereoscopic imaging plane of the virtual camera.

11. The image generating method according to claim 8,
wherein a transformation relationship characteristic indicating a relationship between a distance of a picture element from an optical axis by a distorted image of the camera image data and a distance of a picture element from an optical axis by a non-distorted image of the camera image data is determined in advance, and
wherein the method corrects a distortion of a coordinate system of the position of the each picture element of the single camera image data captured by the real camera, by using the distance of the each picture element from the optical axis and the transformation relationship characteristic, to transform it into a coordinate system of the virtual stereoscopic imaging plane.

12. The image generating method according to claim 8, further comprising setting the virtual camera on an arbitrary spatial position in accordance with an external operation to a virtual camera setting operation member.

13. The image generating method according to claim 8, further comprising
setting the downward tilt angle of the distant view imaging plane to the close view imaging plane in accordance with an external operation to a virtual stereoscopic imaging plane setting operation member.

14. The image generating method according to claim 8, wherein the camera image data is captured by a rear camera attached to a rear part of a vehicle and which images a view behind the vehicle.

* * * * *